Figure 1:
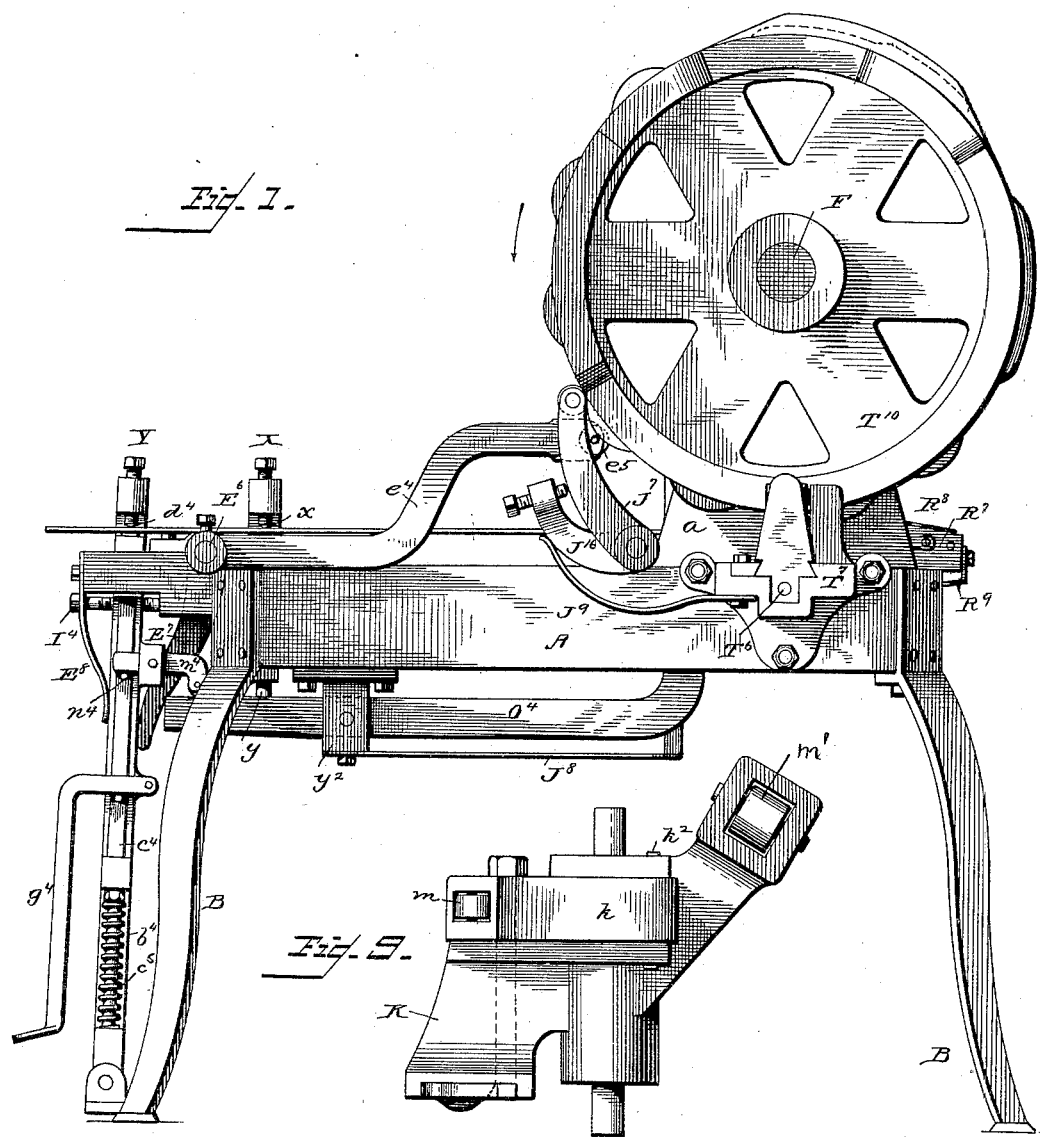

(No Model.) 5 Sheets—Sheet 1.
D. F. WILLIAMS.
MACHINE FOR FORGING HORSESHOE NAILS.

No. 409,890. Patented Aug. 27, 1889.

(No Model.) 5 Sheets—Sheet 2.

D. F. WILLIAMS.
MACHINE FOR FORGING HORSESHOE NAILS.

No. 409,890. Patented Aug. 27, 1889.

Witnesses

Inventor
David F. Williams
By his Attorney
Franklin H. Hough (No Model.)  5 Sheets—Sheet 3.
D. F. WILLIAMS.
MACHINE FOR FORGING HORSESHOE NAILS.

No. 409,890.  Patented Aug. 27, 1889.

Witnesses  Inventor
  David F. Williams
By his Attorney
  Franklin H. Hough (No Model.) 5 Sheets—Sheet 5.

D. F. WILLIAMS.
MACHINE FOR FORGING HORSESHOE NAILS.

No. 409,890. Patented Aug. 27, 1889.

Witnesses
Inventor
David F. Williams
By his Attorney
Franklin H. Hough

UNITED STATES PATENT OFFICE.

DAVID F. WILLIAMS, OF PLATTSBURG, ASSIGNOR OF ONE-THIRD TO TIMOTHY J. SULLIVAN, OF ALBANY, NEW YORK.

MACHINE FOR FORGING HORSESHOE-NAILS.

SPECIFICATION forming part of Letters Patent No. 409,890, dated August 27, 1889.

Application filed April 4, 1888. Renewed February 11, 1889. Serial No. 299,558. (No model.)

*To all whom it may concern:*

Be it known that I, DAVID F. WILLIAMS, a citizen of the United States, residing at Plattsburg, in the county of Clinton and State of New York, have invented certain new and useful Improvements in Machines for Forging Horseshoe-Nails; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to horseshoe-nail machines, and it has for its object to provide a machine that is adapted to simultaneously roll and hammer the nail, and to both form the head and bevel the point, and finally to cut the completed nail from the nail-rod and discharge it from the machine finished and ready for use.

The present invention is in many particulars similar to that described in Patent No. 333,984, granted to me January 5, 1886; but it is distinguished from said machine primarily by the fact that said machine stops short of the completed nail, making only a nail-blank, while the machine herein described, and which forms the subject-matter of the present application, will bevel, straighten, and point the nail.

The invention consists, broadly, in combining with the anvil or anvils and a revolving carrier provided with rollers and a series of cam-surfaces a pair of horizontally-arranged hammers and dies to impart side pressure upon the nail-blank and shape the same.

The invention further consists in the combination, with the revolving carrier and its rollers, of a movable frame carrying the anvils and the shearing-dies, and the mechanism for automatically adjusting said frame laterally.

To these ends and such others as the invention may relate, the same consists in the peculiar combinations and in the novel construction, arrangement, and adaptation of parts, all as more fully hereinafter described, shown in the accompanying drawings, and then specifically defined in the claims.

Figure 2:
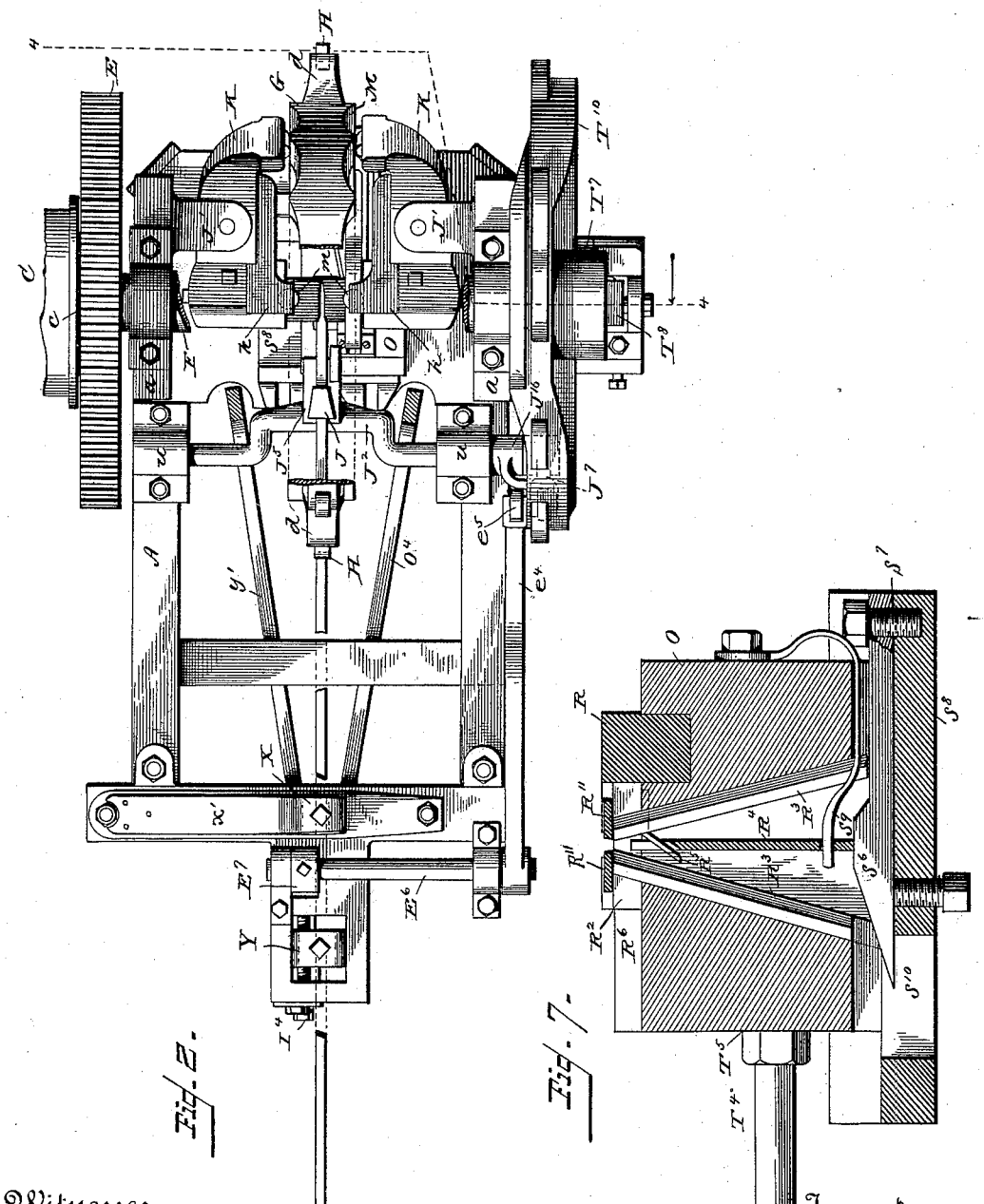
Figure 3:
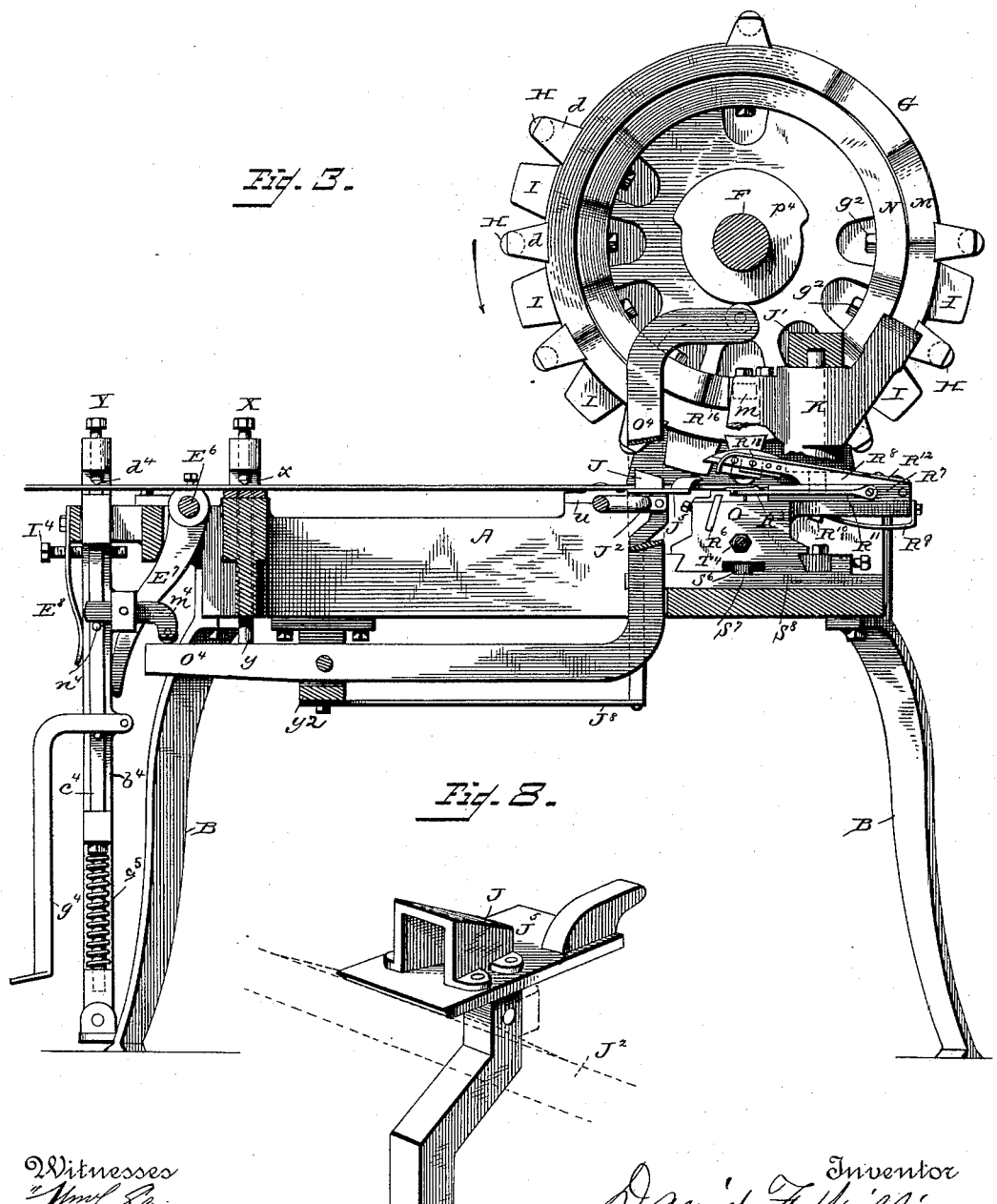
Figure 4:
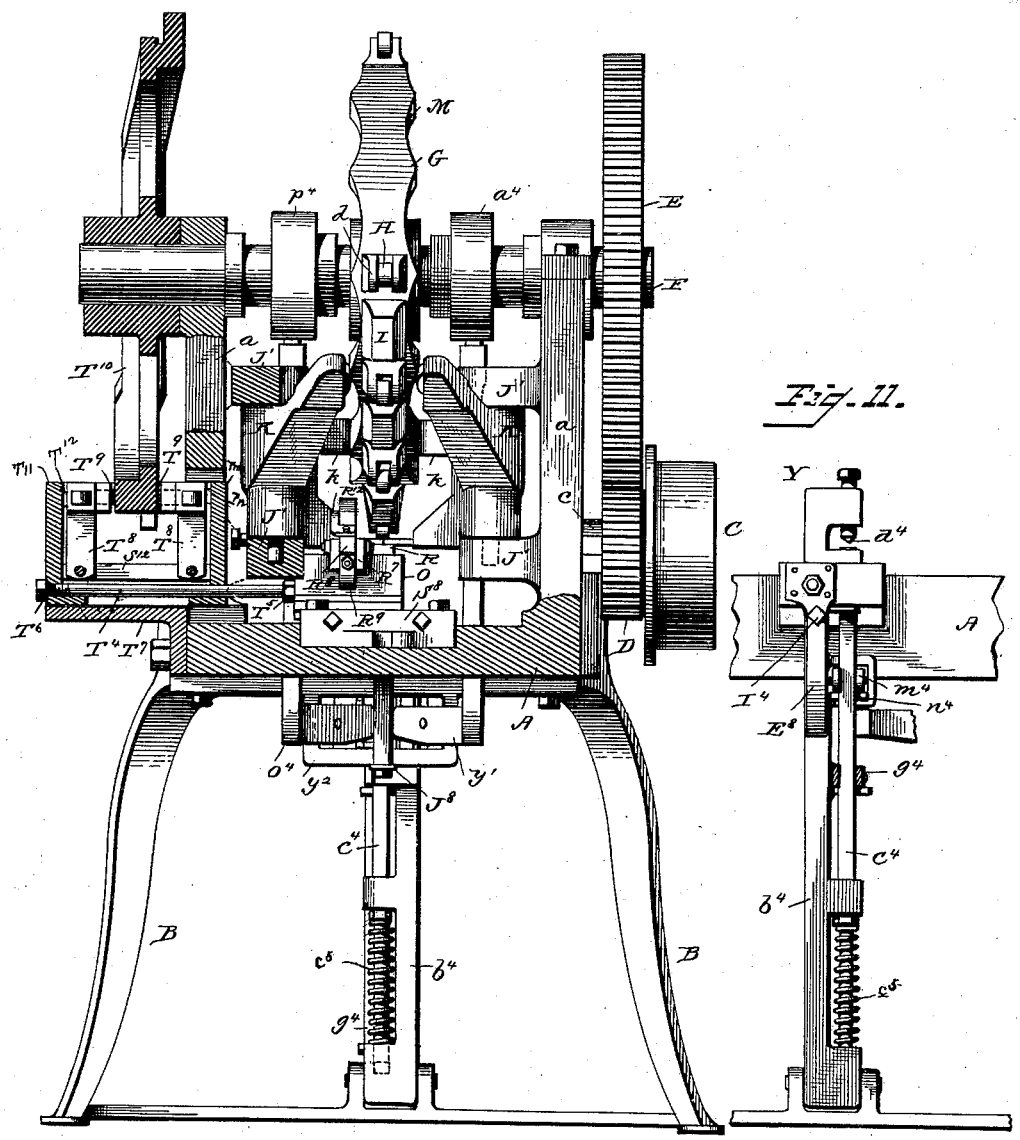
Figures 5, 6:
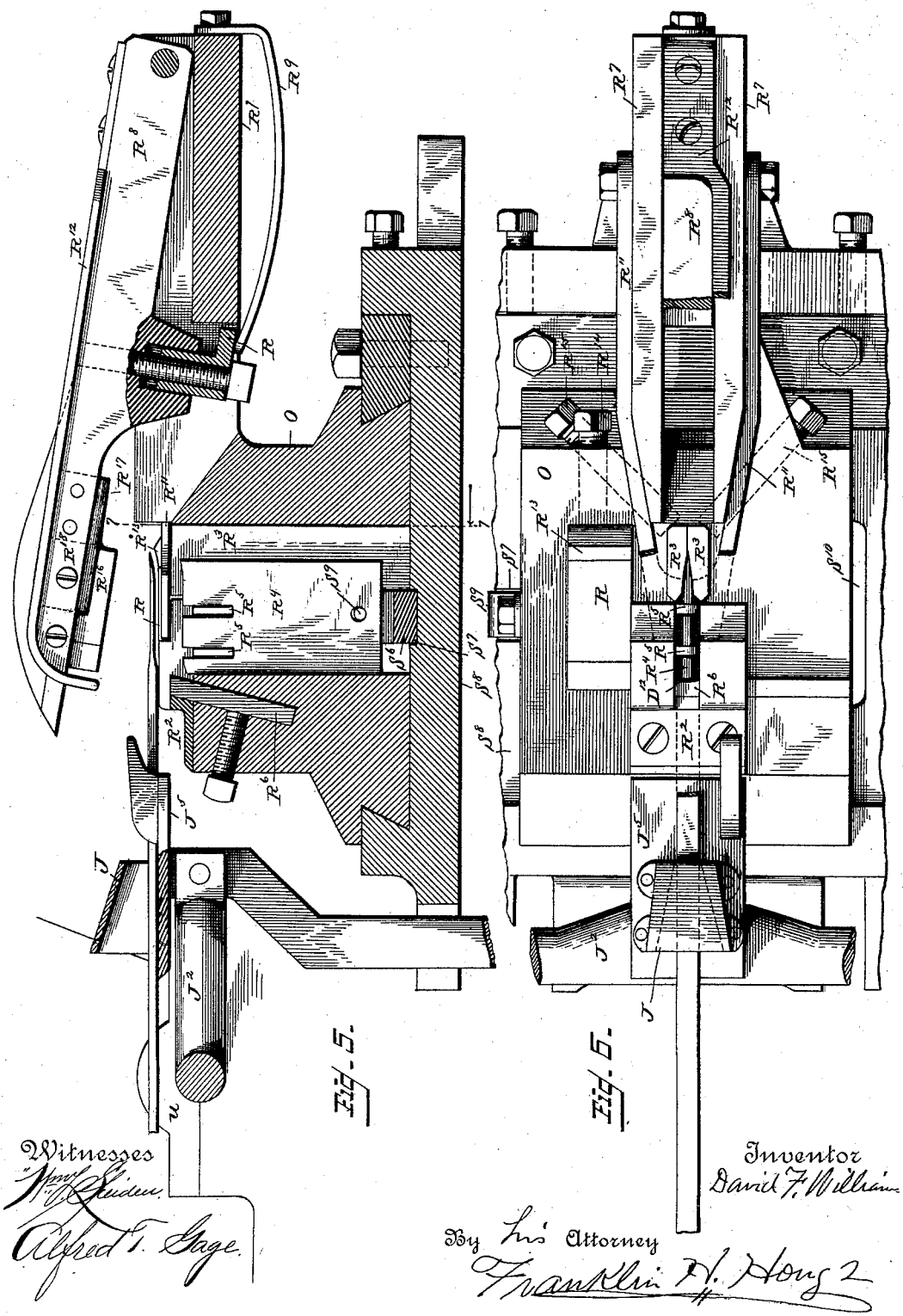

In the drawings, Figure 1 is a side view of a machine constructed in accordance with my invention. Fig. 2 is a plan view of the same with parts broken away. Fig. 3 is a longitudinal vertical section. Fig. 4 is a transverse section on line 4 4 of Fig. 2. Fig. 5 is a detailed longitudinal section through the anvil and punch mechanism. Fig. 6 is a plan view of the same. Fig. 7 is a transverse section on line 7 7 of Fig. 5. Fig. 8 is a detailed perspective view of the nose-guide. Figs. 9 and 10 are side and bottom views of the side hammer, and Fig. 11 is a front elevation of the movable portion of the feed mechanism.

Reference being had to the details of the drawings, A represents the main frame of the machine, which may be of cast metal, and is provided with suitable legs B. Motive power is applied through a pulley C, placed upon a counter-shaft $c$, provided with a pinion D, and motion is transmitted through the latter and the gearing E to the main shaft F, upon which is mounted the revolving carrier G. The carrier G is provided with openings around its periphery to receive the device for supporting the rollers H. Each roller H is mounted in the forks of a clip $d$, the shanks of which pass down through the periphery of the carrier G and are secured by nuts $g^2$. The adjustment of the roller-stock as to its radial distance from the axis of the carrier may be accomplished by means of adjusting screws, wedges, or shims; but I prefer the latter.

I I represent bearing surfaces or blocks projecting from the periphery of the carrier between the rollers H, and said projecting surfaces are designed to prevent the nail from getting over the die when being operated upon by the side dies when the latter is raised by the nose-guide J, to be hereinafter described.

M represents an annularly-arranged series of cam surfaces or projections formed on each side of the carrier, and N represents a similar series of cams arranged within the first series M.

In the rear of the standards $a\ a$, which support the shaft F, are secured two brackets J' J', between the projecting arms of which are pivoted the hammers K K, for imparting side pressure to the nails and to draw the nail rearward at the same time. The inner and upper portion of each hammer is recessed to receive the forked strip $k$, pivoted at $k^2$ and provided with a roller $m$, which runs in contact with the cams N of the carrier, the object being to withdraw the inner end of the hammers in which the dies are fastened and to permit the rollers to pass when the nail is being operated upon by the dies. Back of this strip, within a recess formed in the hammer, is placed a rubber block, which serves to keep the rollers $m$ and $m'$ firmly against the cam upon which they travel and at the same time to compensate for wear. It will be observed that by this construction I am enabled to impart what might be termed a "draw stroke" to the side of the nail—that is, I draw the nail slightly toward the rear of the machine and at the same time impart side pressure, in order to impart to the nail the shape of the dies carried by the hammers. The anvil or anvils of the machine are supported within a block O, which is arranged within a dovetailed seat below the carrier. This block is adapted to slide freely in a transverse direction within its seat, and it may be provided with means to compensate for wear, such as are used in planing or other machines.

Within the upper face of the anvil-block O is seated the anvil R and beveler $R^{13}$, the guard $R^2$, the shearing-dies $R^3$, the former $R^4$, the nail-mover $R^5$, and the lower cutter $R^6$. At the rear end of the block, and within the arm $R^7$, is pivoted the cutter-stock $R^8$, provided with a retracting-spring $R^9$, operating upon the adjustable step $R^{10}$ in the cutter-stock. Upon the sides of the arm are fastened guard-springs $R^{11}$, and upon the top of the cutter-stock is placed a spring $R^{12}$.

The anvil R is made in the usual form, and at its rear end is placed the beveler $R^{13}$, as shown, both being secured by a screw $R^{14}$. This beveler consists of a solid steel-block set into the anvil-block, as shown, and serves to form the proper bevel upon the point of the nail. The shearing-dies $R^3$ (shown in detail in the sectional Fig. 7 of the drawings) consist of plates of steel moving within dovetailed grooves in the anvil-block, and they are set at an angle and inclined toward each other, their shearing-edges meeting at the top, as shown in Fig. 7, the set-screws $R^{15}$ serving to retain the dies in the proper position.

The object of the guard $R^2$ is to guide the rod and the nail upon its end, and it is further intended to serve as a guide for the punch carried upon the outer end of the cutter-stock, so as to insure its accurate guidance between the shearing-dies at the point of the nail, and thus prevent the dies from being injured by frictional contact with the punch.

The guards $R^{11}$ are fastened to the arm $R^7$, and they serve as a guide for the nail, so that it shall be sheared equally on both sides.

At the rear end of the arm on the block O is pivoted the cutter-stock $R^8$, in which is placed a movable punch or die $R^{16}$. This punch is secured within guides $R^{17}$, secured within a slot formed within the lower face of the forward end of the cutter-stock. This punch is adapted to act in concert with the lower head-cutter, which is concaved, as shown at $D^{12}$, and the shearing-dies $R^3$, so as to adapt it to form the rounded head of the nail, the form of the punch $R^{16}$ corresponding with said groove. This punch is secured by a set-screw $R^{18}$.

The former $R^4$, detail sectional views of which are shown in Figs. 5 and 7 of the drawings, moves in a groove formed in the anvil-block, and serves to straighten the nail when it has been operated upon by the punch.

$S^6$ is a step fastened in a groove $S^7$, formed in the slide $S^8$, the object of the step being to raise the former $R^4$ when the nail is ready to be cut from the rod, after which the block moves to the position it is in when the nail is being swaged, and the spring $S^9$ serves to pull the former down below the forked nail-mover $R^5$, the forks of which being at an incline the nail will drop through the hole $S^{10}$ in the slide $S^8$.

The block O with all of its attachments is moved by means of a rod $T^4$, connected with the block at $T^5$. The said rod is secured to the carriage at $T^6$, the said carriage being adapted to move within suitable bracket $T^7$, fastened to the frame of the machine, as shown.

$T^8$ are standards pivoted at their lower ends to the slide $S^{12}$ and carrying within their upper ends the friction-rollers $T^9$, which contact with the inner and outer faces of the cam $T^{10}$, secured to the outer end of the main shaft. The standards $T^8$ are adapted to move against posts $T^{11}$ at the sides of the slides, which serve to retain the carriage in proper position. Between the posts $T^{11}$ and the standards $T^8$ may be placed rubber buffers to deaden the shock of the cam $T^{10}$.

The mechanism for feeding the nail-rod will be readily understood from the following description: I employ a stationary grip X and a movable grip Y, having alternate periods of action. The stationary grip consists of an adjustable chisel-edged grip $x$, arranged upon a spring $x'$, one end of which is secured to the frame A, Fig. 2. The spring $x'$ is periodically lifted to release the nail-rod by a pin $y$, resting upon a lever $y'$, fulcrumed upon a depending bracket $y^2$ on the under side of the machine and having its rear end engaged by a cam $a^4$ on the shaft F. The movable grip Y consists of a feed-arm $b^4$, pivoted at its lower end to a cross-bar of the frame, a spring pressure-rod $c^4$, arranged in bearings in the feed-arm, an adjustable chisel-edged grip $d^4$, and a lever $e^4$. The lever $e^4$, carrying at its inner end the friction-roller $e^5$, as shown in Figs. 1 and 2, is journaled at its opposite end to the shaft $e^6$, which shaft is journaled in boxes upon the upper face of the frame at its forward end. Also journaled on the shaft $E^6$ is the lever $E^7$, the lower end of which contacts with the feed-lever $b^4$ and serves to push the same backward after it has been moved forward by the spring $E^8$. A stop-screw $I^4$ is passed through the feed-arm $b^4$ to bear against the front end of the frame or against a block affixed thereto, so as to regulate the feed of the nail-rod.

It is necessary to provide a means for automatically depressing the rod $c^4$ to release the grip and permit the feed of the rod. I accomplish this by pivoting a short lever $m^4$ to a projection of the feed-arm $b^4$. The front end of the lever $m^4$ is forked to embrace the rod $c^4$ and to engage a pin $n^4$, projecting therefrom, when the rear end of the lever $m^4$ is raised by a lever $o^4$, fulcrumed upon the bracket $y^2$ and having its rear free end in contact with a cam $p^4$ on the shaft F, thus depressing the rod $c^4$ after the nail-rod is fed forward by the spring $E^8$. The spring $c^5$ serves to raise the rod $c^4$ and grips the nail-rod for the next forward movement. A foot-lever $g^4$ is pivoted at its upper end to the feed-arm and connected to the rod $c^4$ to depress the rod $c^4$ and release the nail-rod when it is necessary to take said rod out of the machine.

It is necessary to raise the nail from the face of the anvil while it is being acted upon by the dies of the swinging hammers, and, as above stated, a nose-guide J is used for this purpose. Said guide is secured to the holder $J^5$, which is pivoted in the fork of the lever $J^2$ directly in front of the rolls on the carrier, said lever $J^2$ being fulcrumed in boxes $u$ at the sides of the frame A. At the end of said lever are fastened two arms. The inner arm $J^{16}$ is made fast to the lever $J^2$ and bent outwardly at the end, so as to form a rest for the outward lever $J^7$, the end of which rests on the series of cam-surfaces on the periphery of the large cam $T^{10}$, whereby the nose-guide is raised intermittently after the departure of the rollers H and the arrival of the side dies. At the lower end of the holder $J^5$ is fastened a spring $J^8$. Another is shown at $J^9$, the object of which being to cause the nose-guide to sink promptly on the passage of the projection on the cam-wheel.

The operation of the machine has in part been described above, but the following is added in order to render the operation in all respects perfectly clear. The nail-rod is passed under the two grips, and thence through the nose-guide to the smooth anvil R. The revolution of the carrier brings the rollers H into contact with the nail-rod, and simultaneously the two hammers, with their dies, are forced toward each other by the carrier to impart a draw blow to the sides of the nail. After the nail-rod has been drawn out to the length of a nail-blank the frame O is automatically moved to bring the anvil $R^8$ under the carrier, where the nail is further shaped by the rollers and hammers, after which the frame O is again shifted automatically by its lever and cam, so as to bring the die-guards and cutter-arm under the carrier. The opposite roller then passes over the arm to depress the punch, the former-block having been pressed under the punch by the contact of its spring-rod with the frame. The punch forces the nail through the die and discharges it through an opening in the side of the frame.

Having thus described my invention, what I claim to be new, and desire to secure by Letters Patent, is—

1. In a horseshoe-nail machine, the combination, with an anvil, of a revolving carrier provided with a series of peripheral rollers and with a series of cam-surfaces, said rollers and cam-surfaces being on a disk common to both, horizontally-arranged hammers and dies, and an adjustable cutter or finishing-die, substantially as described.

2. In a horseshoe-nail machine, the combination, with the anvil, of a revolving carrier provided with a series of peripheral rollers and with peripheral bearing-surfaces alternating with the said rollers, and horizontally-arranged hammers provided with dies, substantially as described.

3. The combination, with the main frame and the revolving carrier and its rollers, of an adjustable frame supporting an anvil, a forming-die, and cutter-blade adapted to be operated by one of said rollers, substantially as described.

4. The combination, with the carrier having peripheral rollers, as described, and formed on each side with centrally-arranged cam-surfaces, of pivoted hammers with projecting rollers arranged in contact with said surfaces, substantially as described.

5. The combination, with the carrier having peripheral rollers and formed on each side with two series of alternating cam-surfaces, of pivoted hammers provided with dies and with projecting rollers arranged in contact with said cam-surfaces, whereby the dies of said hammers are alternately thrown inward and retracted, substantially as described.

6. The combination, with the revolving carrier and its rollers, of a movable and adjustable frame within which are supported the anvils, an adjustable former, and a spring-pressed arm carrying a cutter, said arm being depressed by contact with one of the rollers on the carrier, substantially as described.

7. The combination, with the carrier and its rollers, of one or more flat plain anvils and a beveled anvil, substantially as described.

8. The combination, with the frame which supports the anvils, of guards and a die, and an adjustable former arranged within the die, substantially as described.

9. The combination, with the carrier and peripheral rollers thereon, of spring-pressed arm adapted to be pressed by contact with one of the rollers of the carrier, and an adjustable blade or cutter, substantially as described.

10. The combination, with the main frame, the carrier, and its rollers, of a frame arranged below said carrier and supporting the anvil or anvils, and the finishing devices, said frame being provided with appliances, substantially as described, whereby it is moved and retracted, substantially as described.

11. In a horseshoe-nail machine, the combination, with the revolving carrier and the horizontally-moving hammers and dies, of a stationary grip and a vibrating grip, substantially as described.

12. The combination, with the dies and the reciprocating punch, of the spring-actuated former arranged to move vertically, as set forth.

13. The combination, with the anvil R and the pivoted die-stock carrying the punch, of the guard $R^2$ and the guards, substantially as and for the purpose described.

14. The combination, with the block O and its attached appliances, of the carriage, the main shaft, and the cam $T^{10}$ on the main shaft, and the connection between the carriage and the block, substantially as and for the purpose described.

15. The combination, with the block O and its attachments, of the carriage, the rod connecting said carriage and block, the cam $T^{10}$ on the main shaft, the slide $S^{12}$, and the standards pivoted to said slide and carrying friction-rollers engaging said cam, substantially as and for the purpose described.

16. The combination, with the block O, its anvil and shearing-dies, and the former, of the nail-pusher, substantially as and for the purpose specified.

17. The combination, with the block O, its anvil and shearing-dies, and the former, of the inclined nail-pusher, substantially as described.

18. The combination, with the block O, its anvil and shearing-dies, and the former, of the inclined forked nail-pusher, substantially as described.

19. The combination, with the feed-arm $b^4$ and the spring-actuated rod $c^4$, arranged in bearings on said feed-arm, of the lever pivoted on said feed-arm and connected with said rod, substantially as and for the purpose specified.

20. The combination, with the movable grip, the feed-arm, and the rod $c^4$, of the lever $m^4$, pivoted on said arm and engaging said rod, the cam $p^4$ on the main shaft, and the lever $o^4$, substantially as described.

21. The combination, with the feed-arm and the spring $E^8$, of the lever $E^7$, bearing on the feed-arm in opposition to the said spring, substantially as described, and for the purpose specified.

In testimony whereof I affix my signature in presence of two witnesses.

DAVID F. WILLIAMS.

Witnesses:
J. B. KEITH,
ROBERT H. KELLY.